(12) United States Patent
Mimura

(10) Patent No.: US 11,383,677 B2
(45) Date of Patent: Jul. 12, 2022

(54) SWITCH DEVICE

(71) Applicant: KABUSHIKI KAISHA TOKAI RIKA DENKI SEISAKUSHO, Aichi (JP)

(72) Inventor: Hironori Mimura, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 240 days.

(21) Appl. No.: 16/646,381

(22) PCT Filed: Aug. 23, 2018

(86) PCT No.: PCT/JP2018/031097
§ 371 (c)(1),
(2) Date: Mar. 11, 2020

(87) PCT Pub. No.: WO2019/054147
PCT Pub. Date: Mar. 21, 2019

(65) Prior Publication Data
US 2020/0269813 A1 Aug. 27, 2020

(30) Foreign Application Priority Data
Sep. 15, 2017 (JP) ............... JP2017-177878

(51) Int. Cl.
*B60R 25/25* (2013.01)
*B60K 35/00* (2006.01)
*H01H 13/02* (2006.01)
*H01H 13/52* (2006.01)

(52) U.S. Cl.
CPC ............ *B60R 25/252* (2013.01); *B60K 35/00* (2013.01); *H01H 13/023* (2013.01); *H01H 13/52* (2013.01)

(58) Field of Classification Search
CPC ........ H01H 13/14; H01H 13/50; H01H 13/83; H01H 2013/026; H01H 9/18; H01H 9/182; H01H 2019/036; H01H 13/023; H01H 13/52; H01H 13/02; B60R 25/252; B60R 25/25; B60K 35/00
See application file for complete search history.

(56) References Cited

U.S. PATENT DOCUMENTS 10,590,901 B2 * 3/2020 Imai .................... F02N 11/0803
10,598,142 B2 * 3/2020 Imai .................... H01H 13/7006

FOREIGN PATENT DOCUMENTS

| JP | 2006-164573 A | 6/2006 |
| JP | 2008-018834 A | 1/2008 |
| JP | 2017-052407 A | 3/2017 |

OTHER PUBLICATIONS

International Search Report, dated Nov. 27, 2018 by the Japan Patent Office (JPO), in International Application No. PCT/JP2018/031097.

* cited by examiner

Primary Examiner — Lheiren Mae A Caroc
(74) Attorney, Agent, or Firm — Greenblum & Bernstein, P.L.C.

(57) ABSTRACT

A switch device includes a push button to be displaced in a direction toward a main body by a push operation performed on an operation surface thereof, a light source to emit an illumination light from an internal portion of the push button toward the operation surface, and a first substrate that is arranged in the push button in a state of mounting the light source so as to be displaced integrally with the push button upon the push operation.

9 Claims, 2 Drawing Sheets

SWITCH DEVICE

CROSS-REFERENCES TO RELATED APPLICATIONS

The present patent application claims the priority of Japanese patent application No. 2017/177878 filed on Sep. 15, 2017, and the entire contents of Japanese patent application No. 2017/177878 are hereby incorporated by reference.

TECHNICAL FIELD

The present invention relates to a switch device.

BACKGROUND ART

A vehicle operation switch is known which is provided with a light source illuminating a switch knob from a back-surface side (see, e.g., Patent Literature 1).

The vehicle operation switch is configured that the light source is mounted on a substrate which is attached to an escutcheon. The switch knob is attached to a guide rail of the escutcheon and is displaced along the guide rail upon a push operation. The switch knob has a design portion such as letters and is illuminated by the light source.

CITATION LIST

Patent Literature

Patent Literature 1: JP 2008/18834 A

SUMMARY OF INVENTION

Technical Problem

The vehicle operation switch disclosed in Patent Literature 1 is configured such that the light source is attached to the substrate on the escutcheon side. Thus, a problem may arise that the distance between the light source and the back surface of the switch knob is changed by the push operation thereof so that a brightness in the design portion as an illuminated object is changed.

It is an object of the invention to provide a switch device which can prevent a change in brightness of the illuminated object associated with the push operation thereof.

Solution to Problem

According to an embodiment of the invention, a switch device comprises:
  a push button to be displaced in a direction toward a main body by a push operation performed on an operation surface thereof;
  a light source to emit an illumination light from an internal portion of the push button toward the operation surface; and
  a first substrate that is arranged in the push button in a state of mounting the light source so as to be displaced integrally with the push button upon the push operation.

Advantageous Effects of Invention

According to an embodiment of the invention, it is possible to provide a switch device which can prevent a change in brightness of the illuminated object associated with the push operation thereof.

DESCRIPTION OF EMBODIMENTS

Summary of the Embodiment

A switch device in the embodiment comprises a push button to be displaced in a direction toward a main body by a push operation performed on an operation surface thereof, a light source to emit an illumination light from an internal portion of the push button toward the operation surface, and a first substrate that is arranged in the push button in a state of mounting the light source so as to be displaced integrally with the push button upon the push operation.

In the switch device, the first substrate with the light source attached thereto is integrated with the push button. Therefore, the distance between an illuminated object of the push button and the light source does not change before and after the push operation, unlike when the push button and the light source are not integrally displaced. Therefore, in the switch device, change in brightness of the illuminated object upon push operation can be suppressed.

Embodiment (General Configuration of Switch Device 1)

Figure 1A:
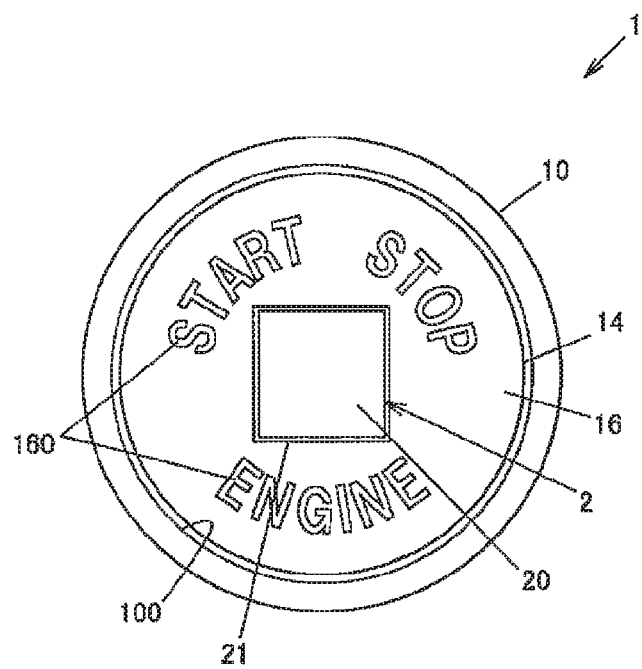
FIG. 1A is an explanatory diagram illustrating a switch device in an embodiment.
Figure 1B:
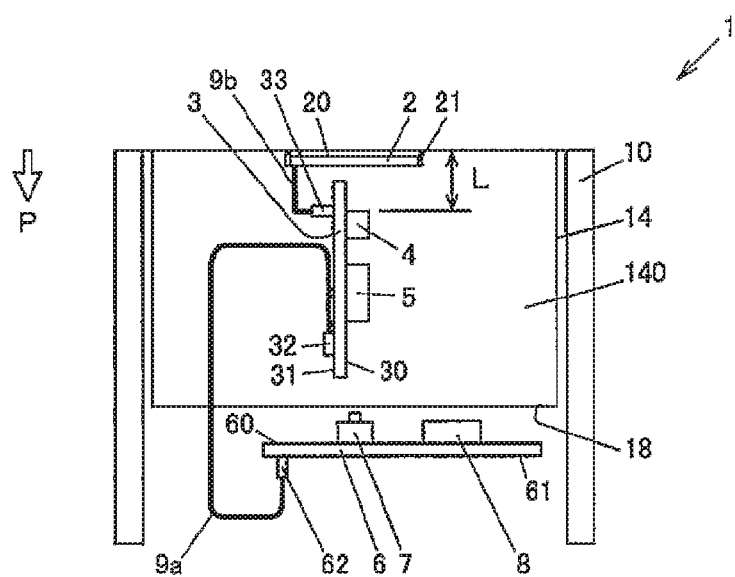
FIG. 1B is a schematic explanatory diagram illustrating a configuration of the switch device in the embodiment.
Figure 2:
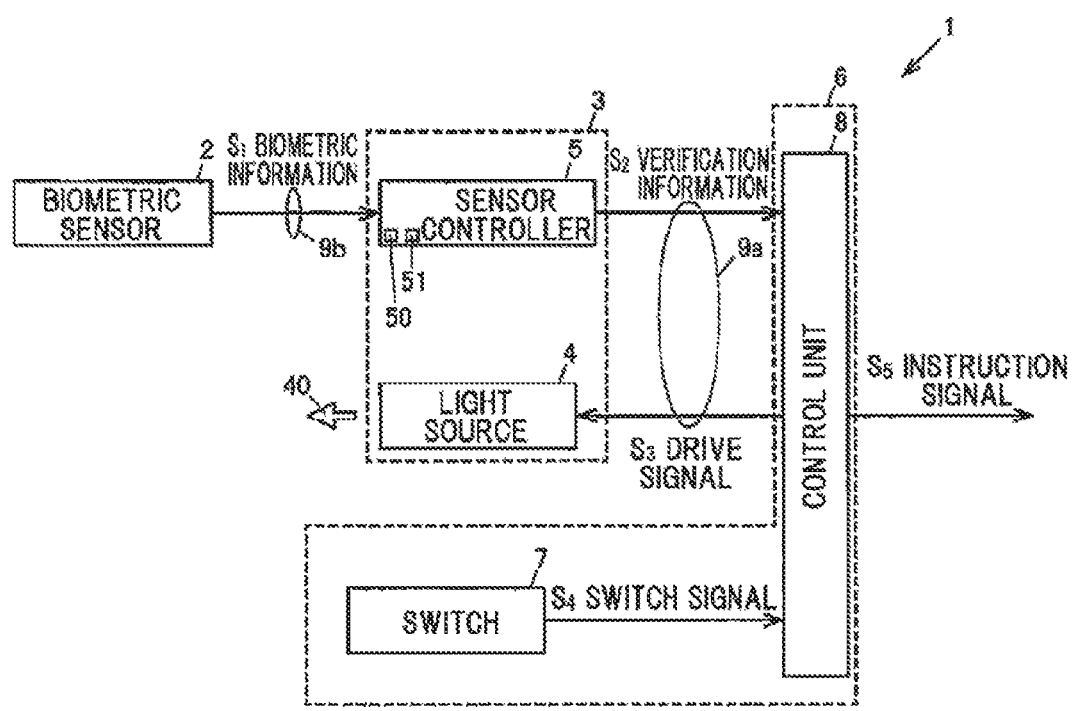
FIG. 2 is a block diagram illustrating the switch device in the embodiment.

FIG. 1A is an explanatory diagram illustrating an example of a switch device in an embodiment, and FIG. 1B is a schematic explanatory diagram illustrating an example of a configuration of the switch device. FIG. 2 is an example block diagram illustrating the switch device in the embodiment. In each drawing of the embodiment described below, a scale ratio may be different from an actual ratio. In addition, in FIG. 2, flows of main signals and information are indicated by arrows.

A switch device 1 has, e.g., a push button 14 which is displaced in a direction toward a main body 10 upon a push operation performed on an operation surface 16, a light source 4 emitting illumination light 40 from an internal portion 140 of the push button 14 toward the operation surface 16, and a first substrate 3 which is arranged in the push button 14 in a state of mounting the light source 4 and is displaced integrally with the push button 14 upon the push operation, as shown in FIGS. 1A, 1B and 2.

The switch device 1 is also provided with a biometric sensor 2 for reading biometric information $S_1$ of an operator who operates the push button 14, and a sensor controller 5 as a verification unit which, together with the light source 4, arranged on the first substrate 3 and performs verification by comparison between the biometric information $S_1$ read by the biometric sensor 2 and enrolled biometric information 51 which has been enrolled beforehand.

The switch device 1 is also provided with a second substrate 6 attached to the main body 10 and mounting a switch 7 which is turned on by the push operation via the push button 14. The first substrate 3 is electrically connected to the second substrate 6 through a flat cable 9a.

The switch device 1 is further provided with the sensor controller 5 which is mounted on the second substrate 6 and outputs an instruction signal $S_5$ to give an instruction to start a drive system of a vehicle when verification of the biometric information $S_1$ performed by the sensor controller 5 based on comparison with the enrolled biometric information 51 is successful and the switch 7 is turned on by the push operation on the push button 14.

As an example, the switch device 1 is configured that the biometric sensor 2 can read the biometric information $S_1$ after doors are unlocked upon authentication based on wireless communication with an electronic key, etc., and drive voltage is supplied from a battery of the vehicle. At this time, a design portion 160, which is an illuminated object, is illuminated by the light source 4.

In the vehicle, the drive system is started when the switch 7 of the switch device 1 is turned on by a push operation and verification of the biometric information $S_1$ is successful.

The drive system is, e.g., an internal combustion engine, a motor, or a combination thereof, etc. The switch device 1 is configured to give an instruction to start/stop the drive system.

(Configuration of the Push Button 14)

The push button 14 is arranged, e.g., in an opening 100 of the main body 10, as shown in FIG. 1A. The push button 14 is configured to be push-operable. In the switch device 1, the switch 7 is provided so as to face an end portion 18 of the push button 14 on the opposite side to the operation surface 16.

(Configuration of the Design Portion 160)

When, e.g., the push button 14 is formed of a transparent resin such as polycarbonate and a black film not allowing light to pass through is formed on the operation surface 16, the design portion 160 is formed by partially removing the film with laser, etc.

Alternatively, to form the design portion 160, for example, the push button 14 and the design portion 160 may be formed by co-molding, or a through-hole having the shape of design portion 160 may be formed on the operation surface 16 and filled with a transparent resin.

The design portion 160 has, e.g., a shape of letters as shown in FIG. 1A. In the design portion 160, as an example, the letters "START STOP" and "ENGINE" are formed in two rows. However, the design portion 160 is not limited to the letters and may be a shape or may be a shape and letters.

The design portion 160 is provided so that, e.g., the rows of the letters sandwich the biometric sensor 2 and are opposed to each other, as shown in FIG. 1A.

(Configuration of the Biometric Sensor 2)

The biometric sensor 2 is arranged at the center of the operation surface 16 of the push button 14. The biometric sensor 2 is configured that a reading surface 20 for reading the biometric information has a rectangular shape and is exposed on the operation surface 16. The position of the reading surface 20 is, e.g., lower than the operation surface 16.

The biometric sensor 2 is configured to read the biometric information $S_1$ of an operating finger in contact with the operation surface 16. As an example, the biometric information $S_1$ includes image information of at least one of fingerprint pattern and vein pattern of the operating finger.

When configured to read, e.g., a fingerprint pattern, the biometric sensor 2 is constructed from an optical, capacitive, electric field strength measuring, pressure-sensitive, or thermal sensor.

Meanwhile, when configured to read, e.g., a vein pattern, the biometric sensor 2 is configured to read a vein pattern based on reflection of infrared radiation.

As an example, the biometric sensor 2 in the present embodiment is a capacitive sensor which reads a fingerprint.

The biometric sensor 2 has a bezel 21 which is arranged to surround the reading surface 20. As an example, the bezel 21 is formed of a metal material with a ring shape and provides a boundary between the operation surface 16 and the reading surface 20.

The biometric sensor 2 outputs the read fingerprint pattern, as the biometric information $S_1$, to the sensor controller 5.

(Configuration of the First Substrate 3)

The first substrate 3 is, e.g., a printed circuit board. For example, the light source 4 and the sensor controller 5 are arranged on a front surface 30 of the first substrate 3.

The first substrate 3 is attached to the push button 14. In addition, the first substrate 3 is arranged such that, e.g., a normal line to the front surface 30 intersects a push operation direction P as shown in FIG. 1B, i.e., the first substrate 3 is vertically arranged when viewed on the paper of FIG. 1B. However, it is not limited thereto and the first substrate 3 may be arranged horizontally when viewed on the paper of FIG. 1B. In addition, the push button 14 may be configured such that, e.g., the internal portion 140 in which the first substrate 3, etc., is attached is sealed with a resin, etc. In this case, it is configured that the flat cable 9a is bent upon a push operation.

Meanwhile, e.g., a connector portion 32 and a connector portion 33 are provided on a back surface 31 of the first substrate 3. The biometric sensor 2 is electrically connected to, e.g., the sensor controller 5 via the connector portion 33 and a flat cable 9b, as shown in FIG. 2. Then, the light source 4 and the sensor controller 5 are electrically connected to, e.g., a control unit 8 via the connector portion 32, the flat cable 9a and a connector portion 62, as shown in FIG. 2.

(Configuration of the Light Source 4)

The light source 4 is configured to have, e.g., a light-emitting element (Light Emitting Diode: LED). Based on, e.g., a drive signal $S_3$ output from the control unit 8, the light source 4 emits the illumination light 40 in a direction toward the operation surface 16 to illuminate the design portion 160, as shown in FIG. 2. As a modification, the switch device 1 may be provided with a light guide arranged in the internal portion 140 of the push button 14 to guide the illumination light 40 of the light source 4 to the design portion 160.

(Configuration of the Sensor Controller 5)

The sensor controller 5 is, e.g., a microcomputer composed of a CPU (Central Processing Unit) performing calculation and processing, etc., of the acquired data according to a stored program, and a RAM and a ROM (Read Only Memory) which are semiconductor memories. The ROM stores, e.g., a program for operation of the sensor controller 5, a decision threshold 50, and the enrolled biometric information 51. The RAM is used as, e.g., a storage area for temporarily storing calculation results, etc.

The sensor controller 5 acquires the biometric information $S_1$ from the biometric sensor 2 via the flat cable 9b and the connector portion 33. Then, the sensor controller 5 performs verification by comparison between the biometric information $S_1$ and the enrolled biometric information 51 and outputs a verification signal $S_2$ indicating the verification result.

In detail, as an example, the sensor controller 5 determines that an operator is the enrolled individual when the degree of similarity between the characteristic features of the fingerprint pattern of the operator based on the biometric information $S_1$ acquired from the biometric sensor 2 and the characteristic features of the fingerprint pattern of the enrolled individual contained in the enrolled biometric information 51 is greater than the decision threshold 50.

When, e.g., the operator who performed a push operation is the enrolled individual, the sensor controller 5 outputs the verification signal $S_2$ indicating the successful verification to the control unit 8 via the connector portion 32, the flat cable 9a and the connector portion 62.

(Configuration of the Second Substrate 6)

The second substrate 6 is, e.g., a printed circuit board. For example, the switch 7 and the control unit 8 are arranged on a front surface 60 of the second substrate 6.

For example, the connector portion 62 is arranged on a back surface 61 of the second substrate 6.

The second substrate 6 is attached to the main body 10. Thus, a distance of the second substrate 6 relative to the push button 14 changes when a push operation is performed.

(Configuration of the Switch 7)

The switch 7 is a micro switch which is turned on by contact with the end portion 18 of the push button 14 due to a push operation performed on the push button 14 and is turned off when released from contact with the end portion 18 due to return of the push button 14 to the original position. The switch 7 may be configured to be, e.g., in continuous contact with the end portion 18 before and after the push operation.

For example, when tuned on, the switch 7 outputs a switch signal $S_4$ to the control unit 8. Based on the input of the switch signal $S_4$, the control unit 8 determines that a push operation is performed on the push button 14.

(Configuration of the Control Unit 8)

The control unit 8 is, e.g., a microcomputer composed of a CPU performing calculation and processing, etc., of the acquired data according to a stored program, and a RAM and a ROM. The ROM stores, e.g., a program for operation of the control unit 8. The RAM is used as, e.g., a storage area for temporarily storing calculation results, etc.

When, e.g., the verification signal $S_2$ is input from the sensor controller 5 and the switch signal $S_4$ is input from the switch 7, the control unit 8 determines that the operator who performed the push operation is the enrolled individual and the control unit 8 generates the instruction signal $S_5$ to give a permission to start the drive system and outputs it to a vehicle control unit, etc.

The control unit 8 also generates the drive signal $S_3$ and outputs it to the light source 4 to illuminate the design portion 160.

(Configuration of the Flat Cable 9a and the Flat Cable 9b)

The flat cable 9a and the flat cable 9b are, e.g., FPC (Flexible Printed Circuit) cables which are flexibly bent. The flat cable 9a and the flat cable 9b have a structure in which, e.g., a highly-flexible thin insulating material such as polyimide is used as a base, an adhesive layer is formed on a film-shaped insulation and a conductive foil is formed thereon.

The flat cable 9a is connected to the connector portion 32 of the first substrate 3 at one end and to the connector portion 62 of the second substrate 6 at the other end. Thus, the flat cable 9a serves for, e.g., transmission of the verification signal $S_2$ and the drive signal $S_3$ between the first substrate 3 and the second substrate 6, as shown in FIG. 2. In addition, the flat cable 9a is highly flexible and is thus highly capable of following the displacement of the push button 14 before and after the push operation.

The flat cable 9b is connected to the biometric sensor 2 at one end and to the connector portion 33 of the first substrate 3 at the other end. Thus, the flat cable 9b serves for, e.g., transmission of the large volume biometric information $S_1$ between the biometric sensor 2 and the first substrate 3.

Effects of the Embodiment

The switch device 1 in the present embodiment is configured that change in brightness of the design portion 160 upon push operation can be suppressed. In detail, in the switch device 1, since the first substrate 3 with the light source 4 attached thereto is integrated with the push button 14, a distance L between the design portion 160 and the light source 4 does not change before and after the push operation, unlike when the push button and the light source are not integrally displaced. Therefore, in the switch device 1, change in brightness of the design portion 160 upon push operation can be suppressed.

In the switch device 1, the biometric sensor 2 and the sensor controller 5 are arranged on the push button 14 and thus can be connected over a shorter distance than when the sensor controller is arranged on the main body. Therefore, it is possible to increase communication speed by, e.g., increasing the number of wirings and thus possible to transmit the large volume biometric information $S_1$ in a short time. In addition, since the large volume biometric information $S_1$ can be sent to the sensor controller 5 in a short time in the switch device 1, time taken for verification of biometric information is shortened and the verification process speed is improved as compared to when such a configuration is not adopted.

Since the biometric sensor 2 and the sensor controller 5 are connected over a short distance, the switch device 1 has improved noise immunity as compared to when the control sensor is arranged on the main body and connected over a long distance. In addition, since the switch device 1 has improved noise immunity, verification accuracy is improved.

Since the switch device 1 is a switch device which is used to start/stop the drive system of the vehicle, reliability of the switch 7 needs to be higher than reliability of the biometric sensor 2. In the switch device 1 in the present embodiment, the first substrate 3 connected to the biometric sensor 2 and mounting the light source 4 is separated from the second substrate 6 mounting the switch 7 and the control unit 8. Therefore, unlike when mounting on the same substrate, failure of the switch 7 or other members and problems due to faulty contact are reduced and it is thereby possible to ensure reliability of the switch 7.

Although the switch device 1 in the present embodiment has been described as a switch device giving instructions to start/stop the drive system of the vehicle, it is not limited thereto. In addition, although the switch device 1 in the present embodiment is provided with the biometric sensor 2, it is not limited thereto.

Although the embodiment of the invention has been described above, the embodiment is merely an example and the invention according to claims is not to be limited thereto. This new embodiment may be implemented in various other forms, and various omissions, substitutions and changes, etc., can be made without departing from the gist of the invention. In addition, all combinations of the features described in the embodiment is not necessary to solve the problem of the invention. Further, the embodiment is included within the scope and gist of the invention and also within the invention described in the claims and the equivalency thereof.

REFERENCE SIGNS LIST

1 SWITCH DEVICE
2 BIOMETRIC SENSOR
3 FIRST SUBSTRATE
4 LIGHT SOURCE
5 SENSOR CONTROLLER
6 SECOND SUBSTRATE
7 SWITCH
8 CONTROL UNIT
9a, 9b FLAT CABLE
10 MAIN BODY
14 PUSH BUTTON
16 OPERATION SURFACE
40 ILLUMINATION LIGHT
50 DECISION THRESHOLD
51 ENROLLED BIOMETRIC INFORMATION
160 DESIGN PORTION

The invention claimed is:

1. A switch device, comprising:
a push button to be displaced in a direction toward a main body by a push operation performed on an operation surface thereof;
a light source to emit an illumination light from an internal portion of the push button toward the operation surface;
a first substrate that is arranged in the push button in a state of mounting the light source so as to be displaced integrally with the push button upon the push operation; and
a biometric sensor to read a biometric information of an operator who operates the push button; and
a verifier that is installed with the light source on the first substrate to check the biometric information read by the biometric sensor against an enrolled biometric information that has been enrolled beforehand.

2. The switch device according to claim 1,
wherein the push button comprises a design portion on the operation surface to be illuminated with the illumination light emitted from the light source.

3. The switch device according to claim 2,
wherein the light source is installed so as to have such a predetermined distance from the design portion that does not change before and after the push operation of the push button.

4. The switch device according to claim 1, further comprising:
a second substrate attached to the main body and mounting a switch to be turned on by the push operation via the push button,
wherein the first substrate is electrically connected to the second substrate through a flat cable.

5. The switch device according to claim 4, further comprising:
a controller installed on the second substrate,
wherein the controller outputs an instruction signal to give an instruction to start a drive system of a vehicle when the verification of the biometric information against the enrolled biometric information is completed by the verifier and the switch is turned on by the push operation of the push button.

6. The switch device according to claim 1,
wherein the biometric sensor is disposed at a center of the operation surface of the push button.

7. The switch device according to claim 1,
wherein the biometric sensor is electrically connected to the verifier through a flat cable.

8. The switch device according to claim 1,
wherein the biometric sensor reads a fingerprint pattern of the operator as the biometric information, and the verifier checks the fingerprint pattern of the operator against an enrolled fingerprint pattern as the enrolled biometric information.

9. The switch device according to claim 8,
wherein the verifier comprises a decision threshold and determines that the operator is an enrolled individual when a degree of similarity between characteristic features of the fingerprint pattern of the operator acquired from the biometric sensor and characteristic features of the enrolled fingerprint pattern as the enrolled biometric information is greater than the decision threshold.

* * * * *